United States Patent
Bono et al.

(10) Patent No.: US 11,023,488 B1
(45) Date of Patent: Jun. 1, 2021

(54) PRESERVING QUALITY OF SERVICE WHEN REPLICATING DATA OBJECTS

(71) Applicant: EMC Corporation, Hopkinton, MA (US)

(72) Inventors: Jean-Pierre Bono, Westborough, MA (US); Himabindu Tummala, South Grafton, MA (US); William C. Davenport, Burlington, MA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 1314 days.

(21) Appl. No.: 14/576,939

(22) Filed: Dec. 19, 2014

(51) Int. Cl.
G06F 17/00 (2019.01)
G06F 16/27 (2019.01)
H04L 29/08 (2006.01)

(52) U.S. Cl.
CPC ............ G06F 16/27 (2019.01); H04L 67/322 (2013.01)

(58) Field of Classification Search
CPC ................................. G06F 16/27; G06F 16/30
USPC ......................................................... 707/634
See application file for complete search history.

(56) References Cited

U.S. PATENT DOCUMENTS

| | | | |
|---|---|---|---|
| 6,449,251 B1 * | 9/2002 | Awadallah | H04L 29/06 370/229 |
| 7,596,585 B2 | 9/2009 | Richardson | |
| 8,549,224 B1 | 10/2013 | Zeryck et al. | |
| 8,818,951 B1 * | 8/2014 | Muntz | G06F 16/13 707/639 |
| 9,378,261 B1 | 6/2016 | Bono et al. | |
| 9,400,792 B1 | 7/2016 | Bono et al. | |
| 10,496,482 B1 * | 12/2019 | Foley | G06F 3/0665 |
| 2006/0069862 A1 | 3/2006 | Kano | |
| 2006/0236061 A1 * | 10/2006 | Koclanes | G06F 3/0605 711/170 |
| 2007/0185934 A1 | 8/2007 | Cannon et al. | |
| 2007/0239803 A1 | 10/2007 | Mimatsu | |
| 2009/0300079 A1 * | 12/2009 | Shitomi | G06F 3/0605 |
| 2011/0197027 A1 | 8/2011 | Balasubramanian et al. | |
| 2011/0282830 A1 * | 11/2011 | Malige | G06F 16/185 707/609 |
| 2012/0005051 A1 * | 1/2012 | Deng | G06Q 30/04 705/34 |
| 2012/0159097 A1 | 6/2012 | Jennas et al. | |
| 2013/0151804 A1 * | 6/2013 | Alatorre | G06F 3/0605 711/170 |
| 2014/0173232 A1 * | 6/2014 | Reohr | G06F 3/0611 711/162 |
| 2015/0261782 A1 * | 9/2015 | McFerrin | G06F 16/178 707/625 |

(Continued)

*Primary Examiner* — Hasanul Mobin
(74) *Attorney, Agent, or Firm* — BainwoodHuang

(57) ABSTRACT

A technique for replicating a data object from a source data storage system (source) to a destination data storage system (destination) preserves QoS (Quality of Service) by transmitting QoS information from the source to the destination and applying the QoS information when storing data at the destination that arrive in replication instructions sent from the source. The QoS information indicates desired storage tiering for the data object at the source. In the event of a failure at the source, which results in failover from the source to the destination, the destination is able to provide users with the same quality of service as was desired at the source.

18 Claims, 8 Drawing Sheets

(56) References Cited

U.S. PATENT DOCUMENTS

| | | | |
|---|---|---|---|
| 2015/0281104 A1* | 10/2015 | Golshan | H04L 47/283 370/238 |
| 2015/0326481 A1* | 11/2015 | Rector | H04L 12/6418 370/236 |
| 2016/0048408 A1* | 2/2016 | Madhu | G06F 11/2097 718/1 |
| 2016/0072880 A1* | 3/2016 | Jacoby | H04L 67/1097 709/217 |
| 2017/0064583 A1* | 3/2017 | Roy | H04W 36/0005 |
| 2017/0237670 A1* | 8/2017 | Puttagunta | H04L 67/1097 370/235 |

* cited by examiner

PRESERVING QUALITY OF SERVICE WHEN REPLICATING DATA OBJECTS

BACKGROUND

Data storage systems are arrangements of hardware and software that typically include multiple storage processors coupled to arrays of non-volatile storage devices, such as magnetic disk drives, electronic flash drives, and/or optical drives, for example. The storage processors service storage requests that arrive from host machines and that specify files or other data elements to be written, read, created, or deleted, for example. The storage processors run software that manages incoming storage requests and performs various data processing tasks to organize and secure data stored on the non-volatile storage devices.

Data storage systems commonly employ replication technologies for protecting the data they store. Conventional replication technologies include those providing continuous replication and those providing snapshot shipping. Well-known continuous replication solutions include Recover-Point and MirrorView systems, which are available from EMC Corporation of Hopkinton, Mass. RecoverPoint systems include a replication splitter and one or more local replication appliances provided both on a source data storage system (source) and on a destination data storage system (destination). As the source processes IO requests specifying data to be written to a particular LUN (Logical Unit Number), the replication splitter on the source intercepts the IO requests and sends them to a local replication appliance (or appliances). The local replication appliance communicates with a replication appliance at the destination, and the two appliances orchestrate storage of the data specified in the IO requests at the destination. In this manner, the destination is made to store a redundant copy of the data of the LUN stored at the source, and the redundant copy at the destination may provide a means for recovering the contents of the LUN in the event of a failure at the source. MirrorView systems perform similar functions to those described for Recover-Point, but communicate directly between a source and a destination with no intervening replication appliances.

A well-known snapshot-shipping replication solution is the Celerra Replicator™ V2, also available from EMC Corporation of Hopkinton, Mass. Replicator V2 operates by taking snaps (i.e., point-in-time copies) of files and file systems at a source, identifying differences between current snaps and previous snaps, and sending the differences to a destination. The destination receives the differences and applies them to replicas maintained at the destination, to update the replicas with changes made at the source.

SUMMARY

Data storage systems often employ storage tiering to improve performance. As is known, "storage tiering" provides a way of segregating different types of data across storage media that provide different qualities of service. For example, a system may store frequently-accessed metadata of a data object on a high tier of storage, such as on high-speed electronic flash drives, but may store infrequently accessed data of the data object on a low tier of storage, such as on slower magnetic disk drives. A data storage system may provide any number of storage tiers that provide different performance levels across any number of performance characteristics.

Unfortunately, the above-described conventional replication technologies do not account for storage tiering decisions when replicating data objects from a source data storage system (source) to a destination data storage system (destination). Thus, efforts to segregate data across different storage tiers at the source do not translate to similarly segregated data at the destination. For instance, the source may place certain critical data on high-speed flash, while the destination may place a replicated version of the same data on slower magnetic disk drives, even when the destination has plenty of high-speed flash storage available. In such an arrangement, when a failure at the source results in failover from the source to the destination, the destination will not be able to provide the same quality of service as was provided at the source. Users will thus experience an undesirable reduction in their quality of service.

In contrast with the prior approach, an improved technique for replicating a data object from a source data storage system (source) to a destination data storage system (destination) preserves QoS (Quality of Service) by transmitting QoS information from the source to the destination and applying the QoS information when storing data at the destination that arrive in replication instructions sent from the source. The QoS information indicates desired storage tiering for the data object at the source. In the event of a failure at the source, which results in failover from the source to the destination, the destination is able to provide users with the same quality of service as was desired at the source. Reductions in quality of service when failing over from source to destination are therefore avoided.

Certain embodiments are directed to a method of preserving quality of service (QoS) when replicating data objects from a source data storage system (source) to a destination data storage system (destination). The method includes generating, by the source, QoS information indicating desired storage tiering for a data object made available by the source to a set of hosts. The method further includes transmitting the QoS information from the source to the destination, the destination thereby receiving the QoS information. In response to receiving replication instructions from the source that specify data to be written to a replica of the data object in the destination to promote keeping the replica current with the data object in the source, the method further includes storing the data specified in the replication instructions in the replica on a set of media that meet the desired storage tiering indicated for the data object in the QoS information, such that storage tiering for the replica at the destination conforms with the desired storage tiering for the data object at the source.

Other embodiments are directed to a computerized system constructed and arranged to perform a method of preserving quality of service when replicating data objects from a source data storage system to a destination data storage system, such as the method described above. Still other embodiments are directed to a computer program product. The computer program product stores instructions which, when executed by a computerized system, cause the computerized system to perform a method of preserving quality of service when replicating data objects from a source data storage system to a destination data storage system, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for replicating a data object from a source data storage system (source) to a destination data storage system (destination) preserves QoS (Quality of Service) by transmitting QoS information from the source to the destination and applying the QoS information when storing data at the destination that arrive in replication instructions sent from the source. The QoS information indicates desired storage tiering for the data object at the source. In the event of a failure at the source, which results in failover from the source to the destination, the destination is able to provide users with the same quality of service as was desired at the source.

Figure 1:
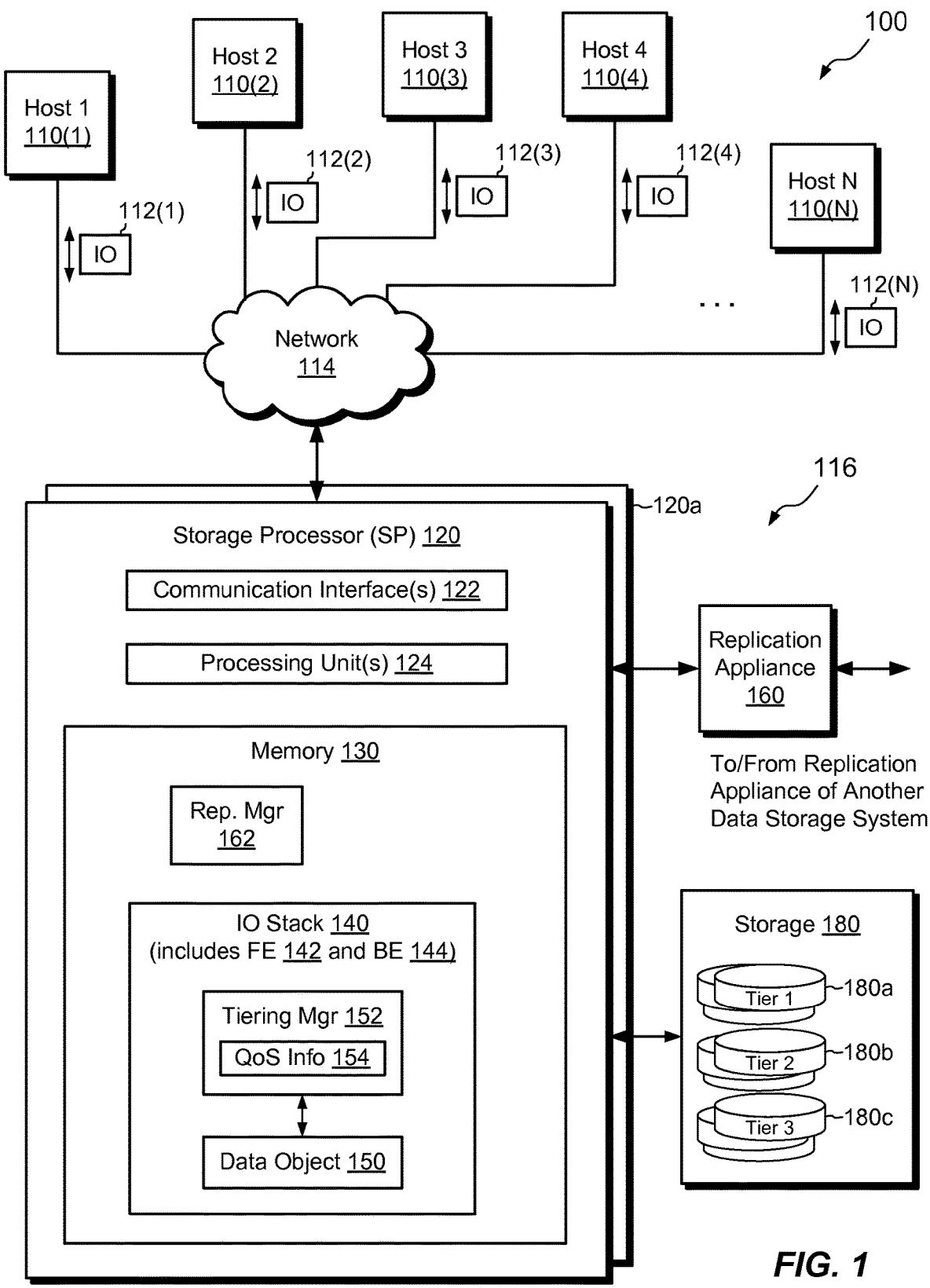
FIG. 1 is a block diagram showing an example environment in which improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in multiple tiers of storage, including Tier 1 storage 180a, Tier 2 storage 180b, and Tier 3 storage 180c. In an example, Tier 1 storage 180a includes high-speed electronic flash drives, Tier 2 storage 180b includes slower electronic flash drives, and Tier 3 storage 180c includes magnetic disk drives. Any number of tiers of storage may be provided. The data storage system 116 may include multiple SPs like the SP 120 (e.g., a second SP, 120a). For example, multiple SPs may be provided as circuit board assemblies, or "blades," which plug into a chassis, which encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

Although FIG. 1 shows only a single data storage system 116, it is understood that many operations described herein involve activities that take place between two data storage systems, i.e., between a source data storage system (source) and a destination data storage system (destination). The source and destination may be connected via the network 114 or via any suitable means. The particular construction shown for the data storage system 116 is intended to be representative of both the source and the destination, although it should be understood that the source and the destination may vary in their particular details.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein, e.g., alone or in coordination with similar control circuitry on another data storage system. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As shown in FIG. 1, the memory 130 includes an IO stack 140 and a replication manager 162. The IO stack 140 provides an execution path for host IOs (e.g., IO requests 112(1-N)). In some examples, the IO stack 140 is provided in the form of a separate front end (FE) 142 and back end (BE) 144. The back end 144 may be disposed locally on the SP 120, as shown. Alternatively, the back end 144 may be disposed on another SP (e.g., on SP 120a) or in a block-based array connected to the SP 120 (e.g., in a gateway configuration).

The replication manager 162 controls the establishment of replication settings on particular data objects. The data objects may include any of LUNs, file systems, and/or VVols (virtual volumes, e.g., as are becoming available for VMware, Inc. of Palo Alto, Calif.), for example. The replication manager 162 establishes replication settings on a per-data-object basis, conducts replication sessions, and orchestrates replication activities, including recovery and failover.

In some examples, the replication manager 162 works in coordination with a replication appliance 160. The replication appliance 160 assists in performing continuous replication with another data storage system (e.g., with a destination data storage system), which may be located remotely. In some examples, the replication appliance 160 takes the form of a separate hardware unit. Any number of such hardware units may be provided, and they may work together, e.g., in a cluster.

The IO stack 140 is seen to include a tiering manager 152. The tiering manager 152 directs the IO stack 140 to store data in the storage tiers 180a through 180c in accordance with locally generated QoS information 154. The QoS information 154 identifies storage tiers on which to store data for particular data objects and/or portions of data objects.

In example operation, the hosts 110(1-N) issue IO requests 112(1-N) to the data storage system 116. The SP 120 receives the IO requests 112(1-N) at the communication interfaces 122 and passes the IO requests to the IO stack 140 for further processing. At the front end 142, processing includes mapping IO requests, which are directed to LUNs, host file systems, VVols, and/or other data objects, to internal block-based requests. The front end 142 then directs the internal block-based requests to internal volumes. The front end 142 maps the internal volumes to respective internal files stored in a set of container file systems of the data storage system 116. The IO stack 140 thus converts incoming host IO requests into requests to internal volumes, and further converts the IO requests into requests to internal files. As will be described infra, the front end 142 may perform continuous replication at the level of the internal volumes, e.g., by mirroring internal block-based requests for data writes to a destination system. The front end 142 may also perform snapshot shipping replication at the level of the internal files, e.g., by taking snaps of the files, computing differences between snaps, and sending the differences to the destination system.

For IO requests 112(1-N) that specify data to be written to particular data objects, and/or to portions thereof, the tiering manager 152 applies the QoS information 154 to identify storage tiers on which to place the newly arriving data. For example, the tiering manager 152 appends a tag to each such IO request. The tag indicates a desired QoS as specified in the QoS information 154 for the data to be written. Subsequent layers of the IO stack 140 then access the tag and direct storage of specified data on the storage tier indicated by the tag.

After processing by the front end 142, the IO requests propagate to the back end 144, and the back end 144 executes commands for reading and/or writing the physical storage 180, in accordance with the storage tiering specified in the QoS information 154.

Additional information about storage tiering may be found in copending U.S. patent application Ser. No. 13/928, 591, filed Jun. 27, 2013. Additional information about replication and IO stack mapping may be found in copending U.S. patent application Ser. No. 13/828,294, filed Mar. 14, 2013. The contents and teachings of both of these prior applications are incorporated by reference herein in their entirety.

During replication, when the data storage system 116 acts as a source, the source 116 sends the QoS information 154 to a destination data storage system. The destination applies the QoS information 154 to replicated data arriving in replication instructions from the source 116 and effects the same storage tiering on the destination as was specified in the QoS information 154 generated at the source.

The data storage system 116 may generate the QoS information 154 in a variety of ways and from a variety of sources. In some examples, hosts 110(1-N) request storage of a particular tier, and the data storage system 116 generates the QoS information 154 in accordance with the requested storage tiers. In some examples, the data storage system 116 employs a tiering policy, which assigns different types of data to respective storage tiers, based, for example, on whether the data is file data or metadata, on the type of metadata, on the frequency of access to the data, and/or on other factors.

In some examples, the QoS information 154 identifies storage tiers that apply to data objects as a whole. For example, the QoS information 154 may specify Tier 1 storage for a first LUN and Tier 2 storage for a second LUN. In other examples, the QoS information 154 specifies multiple storage tiers for respective portions of a single data object. For example, the QoS information 154 may designate Tier 1 for storing metadata but may designate Tier 3 for storing non-metadata data (e.g., file data). The QoS information 154 may designate any number of storage tiers for any number of types of data (including any number of types of metadata) and may provide tiering information for any number or types of data objects. In some examples, the data storage system 116 generates QoS information 154 based on a predetermined layout of a data object, such that the QoS information 154 reflects different tiers of storage for different ranges or portions of the data object. In some examples, the data storage system 116 generates QoS information 154 on-the-fly, e.g., on a per-IO-request basis or on a per-block basis. A "block" is the smallest allocatable unit of storage, such as 8 KB, for example. In other examples, the data storage system 116 generates QoS information 154 prior to receiving any IO requests directed to the data object.

The data storage system 116 may store QoS information 154 in any suitable way, and it may store different parts of the QoS information 154 in any number of locations. For example, the data storage system 116 may store QoS information 154 in one or more memory-resident data structures, on any of the storage tiers 180a through 180c, and/or in pre-existing metadata structures used to support the data objects to which the QoS information 154 pertains, such as in inodes, per-block metadata (BMDs), cylinder groups (CGs) and so forth.

In some examples, the QoS information 154 indicates storage tiering that is desired, regardless of whether the data storage system 116 can actually provide the indicated storage tiering. For example, the data storage system 116 may run out of Tier 1 storage 180a, or may never have had Tier 1 storage installed initially. In such cases, the QoS information 154 may indicate Tier 1 storage for certain data objects and/or portions thereof, even when the data storage system 116 is incapable of actually providing Tier 1 storage. In such cases, the data storage system 116 may drop down to Tier 2 storage to satisfy Tier 1 storage requests. When performing replication, the destination receiving the QoS information 154 may store data in accordance with the desired QoS levels, even when the source is unable to satisfy those QoS levels. Thus, limitations imposed by configurations at the source need not affect performance at the destination, and performance can sometimes be improved when failing over from source to destination.

Figure 2:
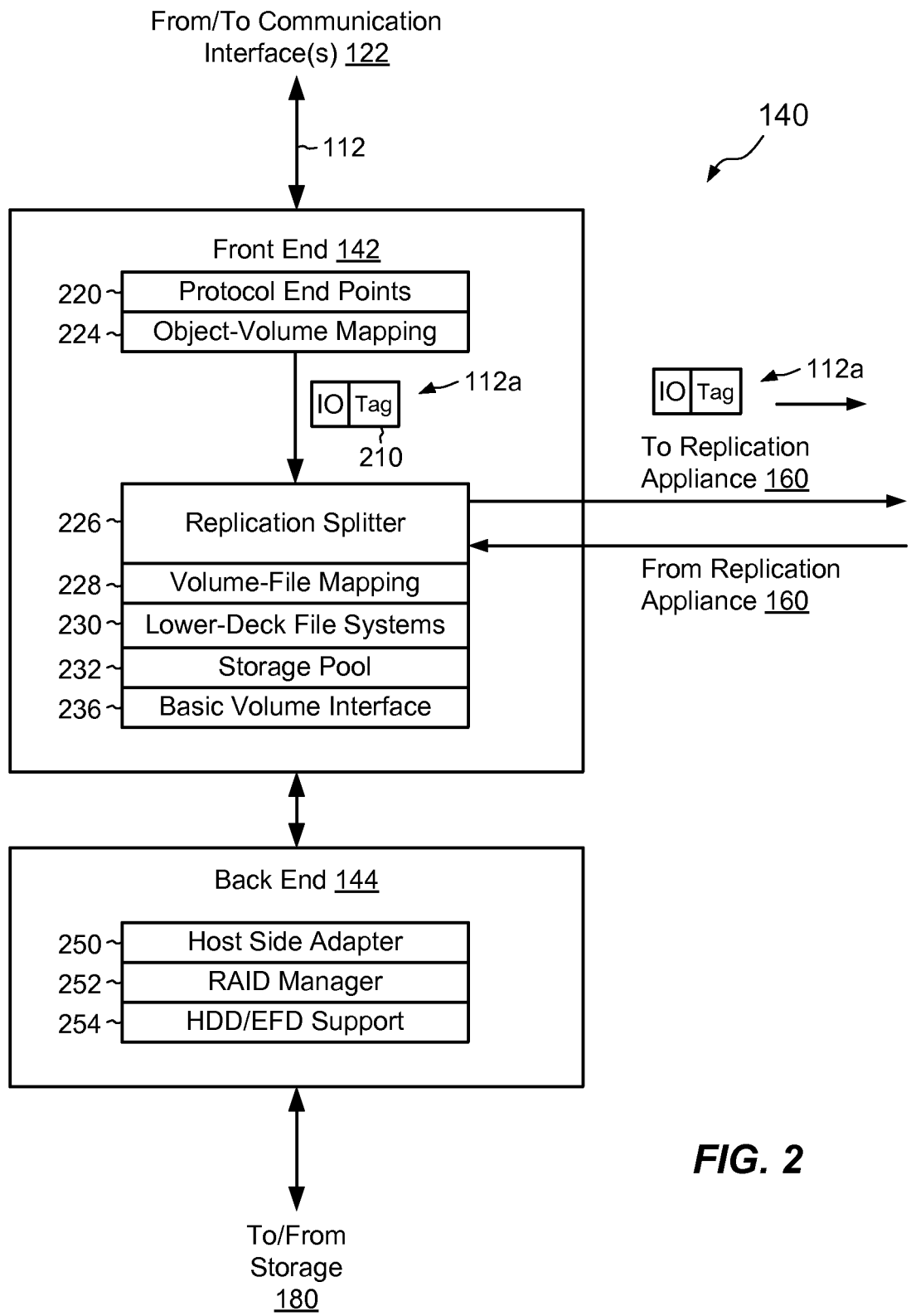
FIG. 2 is a block diagram showing an example IO stack of a storage processor of FIG. 1 in additional detail.

FIG. 2 shows the IO stack 140 in additional detail. Here, the front end 142 is seen to include protocol end points 220, a data object layer 222, an object-volume mapping layer 224, a replication splitter 226, a volume-file mapping 228, lower-deck (internal) file systems 230, a storage pool 232, and a basic volume interface 236. The back end 144 is seen to include a host side adapter 250, a RAID (Redundant Array of Independent Disks) manager 252, and hard disk drive/electronic flash drive support 254. Although IO requests 112 enter the IO stack 140 from the top and propagate down (from the perspective of FIG. 2), the components of the IO stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups and provides access to the RAID groups using RAID protocols. The host side adapter 250 provides an interface to the front end 142, for implementations in which the front end 142 and back end 144 run on different machines. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different hardware. The basic volume interface 236 may be disabled in the arrangement shown in FIG. 1.

The storage pool 232 organizes elements of the storage 180 in the form of slices. A "slice" is an increment of storage space, such as 256 MB or 1 GB in size, which is derived from the storage 180. In an example, each slice is derived from storage media of a single storage tier, e.g., to produce Tier 1 slices, Tier 2 slices, Tier 3 slices, etc. The pool 232 may allocate slices to lower-deck file systems 230 to support the storage of data objects. The pool 232 may also deallocate slices from lower-deck file systems 230 if the storage provided by the slices is no longer required. In an example, the storage pool 232 creates slices by accessing RAID groups formed by the RAID manager 252, dividing the RAID groups into FLUs (Flare LUNs), and further dividing the FLU's into slices.

The lower-deck file systems 230 are built upon slices managed by the storage pool 232 and represent both block-based objects and file-based objects internally in the form of files (container files). The data storage system 116 may host any number of lower-deck file systems 230, and each lower-deck file system may include any number of files. In a typical arrangement, a different lower-deck file system is provided for each data object to be stored. Each lower-deck file system includes one file that stores the data object itself and, in some instances, other files that store snaps of the file that stores the data object. Some implementations allow for storing additional files. Each of the lower-deck file systems 230 has an inode table. The inode table provides a different inode for each file stored in the respective lower-deck file system. Each inode stores properties of a respective file, such as its ownership and the block locations at which the file's data are stored.

In some examples, the lower-deck file systems 230 include the above-described tiering manager 152 and QoS information 154. However, the tiering manager 152 may alternatively be provided in the pool 232 or anywhere in the IO stack 140. Different functions of the tiering manager 152 may be implemented at different layers of the IO stack. Further, the QoS information 154 need not be collocated with the tiering manager 152, provided that the QoS information 154 is accessible to the tiering manager 152.

The volume-file mapping 228 maps each file representing a data object to a respective internal volume. Higher levels of the IO stack 140 can then access the internal volume using block-based semantics. The volume-file mapping can be achieved in a variety of ways. According to one example, a file representing a data object is regarded as a range of blocks (e.g., 8K allocation units), and the range of blocks can be expressed as a corresponding range of offsets into the file. Because volumes are accessed based on starting location (logical unit number) and offsets into the volume, the volume-file mapping 228 can establish a one-to-one correspondence between offsets into the file and offsets into the corresponding internal volume, thereby providing the requisite mapping needed to express the file in the form of a volume.

The replication splitter 226 sits above the volume-file mapping 228 in implementations that support continuous replication. The replication splitter 226 is configurable by the replication manager 162 on a per-data-object basis to intercept IO requests designating data writes and to replicate (e.g., mirror) the data specified to be written according to data-object-specific settings. Depending on the data object to which the IO request is directed and the replication settings defined for that data object, the replication splitter 226 may allow IO requests it receives to pass through to the volume-file mapping 228 unimpeded (e.g., if no replication is specified for that data object). Alternatively, the replication splitter 226 may intercept the IO request, forward the request to the replication appliance 160, and hold the request until the replication splitter 226 receives an acknowledgement back from the replication appliance 160. Once the acknowledgement is received, the replication splitter 226 may allow the IO request to continue propagating down the IO stack 140. It should be understood that the replication manager 162 can configure the replications splitter 226 in a variety of ways for responding to different types of IO requests. For example, replication manager 162 can configure the replication splitter 226 to operate in a pass-through mode for control IOs and for IO requests specifying data reads. In some situations, the replication manager 162 can configure the replication splitter 226 to intercept reads as well as writes. In any such situations, the replication manager 162 can configure the replication splitter 226 on a per-data-object basis.

The object-volume mapping layer 224 maps internal volumes to respective data objects accessible to hosts, such as LUNs, host file systems, and VVols. For LUNs, object-volume mapping may involve simply a remapping from a format compatible with the internal volume to a format compatible with the LUN. In some examples, no remapping is needed. For host file systems, object-volume mapping may be accomplished in part by leveraging from the fact that file systems are customarily built upon volumes, such that an underlying volume is part of the structure of any host file system. Host file systems, also called "upper-deck file systems," are thus built upon the internal volumes presented by the volume-file mapping 228 to provide hosts with access to files and directories. Mapping of VVols can be achieved in similar ways. For block-based VVols, the object-volume mapping layer 224 may perform mapping substantially as it does for LUNs. For file-based vVOLs, the object-volume mapping layer 224 may perform mapping by converting host-specified offsets into VVol files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

In some examples, the IO stack 140 implements different functions of the tiering manager 152 at different levels. For example, when an IO request 112 designating data to be written arrives at or near the top of the IO stack 140, one function of the tiering manager 152 generates QoS information 154 for the specified data, for example, in the form of a tag 210. The tag 210 specifies desired storage tiering of the blocks specified in the IO request 112 at any suitable level of granularity. For example, each tag 210 may specify desired storage tiering at block level granularity or at IO request granularity. The function appends the generated tag 210 to the IO request 112, to produce a tagged IO request 112a, which continues to propagate down the IO stack 140. When the tagged IO request 112a reaches a lower level of the IO stack 140, such as the lower-deck file systems 230 and/or the pool 232, another function of the tiering manager 152 reads the tag 210 and proceeds to store the specified data in one or more slices that provide the storage tiering designated by the tag 210. If the IO stack 140 has not already allocated all the blocks needed to satisfy the IO request 112, the IO stack 140 allocates new blocks from slices providing the designated storage tiers and proceeds to store the specified data in the newly allocated blocks.

When the data storage system 116 is arranged to perform continuous replication, the replication manager 162 (FIG. 1) may configure the replication splitter 226 to mirror IO requests designating data writes to a destination data storage system. In some examples, the replication splitter 226 is configured to mirror tagged IO requests 112a and to convey QoS information 154 to the destination via the tags 210. In other examples, the replication splitter 226 is configured to mirror untagged IO requests 112, with QoS information 154 conveyed by other means. When conveying QoS information 154 via tags 210, the replication splitter 226 may intercept a tagged IO request 112a and send it to the local replication appliance 160 (FIG. 1). The local replication appliance 160 then sends the tagged IO request 112a to a remote replication appliance at the destination. The remote destination appliance destages the tagged IO request 112a to the destination data storage system, which may process the tagged IO request 112a in a manner similar to that done by the data storage system 116. For example, a tiering manager 152 running in the destination reads the tag 210 and applies the tag 210 when allocating storage at the destination to accommodate the data specified in the tagged IO request 112a and when storing the data. In some examples, the replication splitter 226 waits to receive an acknowledgment from the local replication appliance 160 before allowing the tagged IO request 112a to continue down the IO stack 140 at the source.

Figure 3:
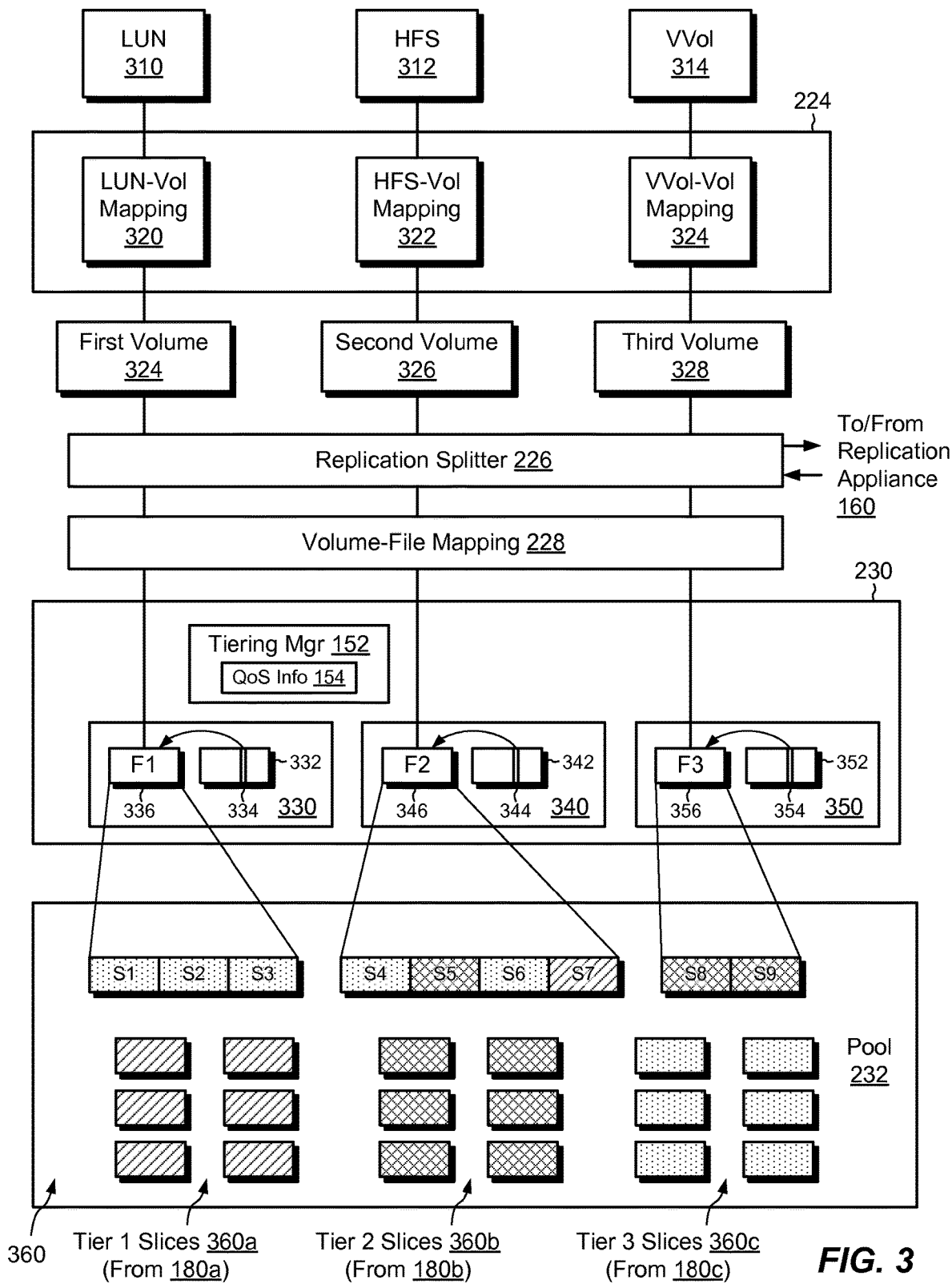
FIG. 3 is a block diagram showing example features of the IO stack of FIG. 2 in further detail.

FIG. 3 shows portions of the front end 142 in additional detail. Here, data objects include a LUN 310, an HFS (host file system) 312, and a VVol 314. The object-volume mapping 224 includes a LUN-to-Volume mapping 320, an HFS-to-Volume mapping 322, and a VVol-to-Volume mapping 324. Using the approach described above, the LUN-to-Volume mapping 320 maps the LUN 310 to a first volume 324, the HFS-to-Volume mapping 322 maps the HFS 312 to a second volume 326, and the Vvol-to-Volume mapping 324 maps the VVol 314 to a third volume 328. The replication splitter 226 may intercept IOs in accordance with settings established by the replication manager 262 (as described above). The Volume-to-File mapping 228 maps the first, second, and third internal volumes 324, 326, and 328 to respective files 336 (F1), 346 (F2), and 356 (F3) in respective lower-deck files systems 330, 340, and 350. Through the various mappings, any set of blocks of the LUN 310 specified in an IO request 112 is mapped to a corresponding set of blocks within the first volume 324 and within the first file 336. Similarly, any file or directory of the HFS 312 specified in an IO request 112 is mapped to a corresponding set of blocks within the second volume 326 and within the second file 346. Likewise, any portion of the VVol 314 specified in an IO request 112 is mapped to a corresponding set of blocks within the third volume 328 and within the third file 356.

The lower-deck file systems 330, 340, and 350 each include a respective inode table, 332, 342, and 352. Inode 334, 344, and 354 provide file-specific information about the first file 336, the second file, 346, and the third file 356, respectively. The information stored in each inode includes location information (e.g., block locations) where data of the respective file are stored.

Although a single file is shown for each of the lower-deck file systems 330, 340, and 350, it is understood that each of the lower-deck file systems 330, 340, and 350 may include any number of files, with each having its own entry in the respective inode table. In one example, each lower-deck file system stores not only the file F1, F2, or F3, but also snaps of those files, and therefore snaps of the data objects realized by the files.

As shown, the storage pool 232 provisions slices 360 to the files F1, F2, and F3. The slices 360 include Tier 1 slices 360a, e.g., derived from RAID groups composed of high-speed flash drives, Tier 2 slices 360b, e.g., derived from RAID groups composed of slower flash drives, and Tier 3 slices 360c, e.g., derived from RAID groups composed of magnetic disk drives. In the example shown, slices S1 through S3 are all Tier 3 slices and store the data of file F1. Slices S8 through S9 are all Tier 2 slices and store the data of file F3. Slices S4 through S7 are a combination of slices from Tier 1, Tier 2, and Tier 3 and store the data of file F2. Thus, the LUN 310 is backed entirely by Tier 3 slices, the VVol 314 is backed entirely by Tier 2 slices, and the HFS 312 is backed by a combination of slices of different tiers.

Because the files F1, F2, and F3 each store entire data objects, including their metadata, the data stored in these files may include both metadata and non-metadata data. For example, file F2 stores an entire host file system, including its file data (non-metadata data) as well as its inodes, indirect blocks, per-block metadata, and so forth.

In some examples, the tiering manager 152 operates in accordance with the QoS information 154 to direct placement of metadata on a higher tier of storage than it does for non-metadata data. For example, the tiering manager 152 may direct data writes for inodes, indirect blocks, and other metadata structures of the host file system 312 to Tier 1 storage, while directing file data of the host file system 312 to Tier 3 storage. Further, the tiering manager 152 may direct different types of metadata of the host file system 312 to different storage tiers.

It should be understood that the IO stack 140 may generate certain IO requests 112 internally. For example, in response to any IO requests 112(1) to 112(N) from hosts designating writes to the host file system 312, the IO stack 140 may generate internal IO requests 112 directed to metadata structures of the host file system 312. The tiering manager 152 may operate on these internal IO requests 112, as well, e.g., by applying respective tags and/or by other means.

Although backing storage for the metadata structures of the lower-deck file systems 230 is not shown, it is understood that slices 360 of the pool 232 may also store such lower-deck metadata in accordance with prescribed storage tiering. For example, the tiering manager 152 may apply storage tiering to inodes, indirect blocks, per-block metadata, and other metadata structures of the lower-deck file systems 230, by generating QoS information that pertains to this metadata and applying this QoS information when allocating storage to support these structures. In some examples, the data storage system sends this QoS information to the destination data storage system, to ensure that any lower-deck metadata structures built for replicas on the destination meet the same quality of service as the QoS information specified on the source.

Figure 4:
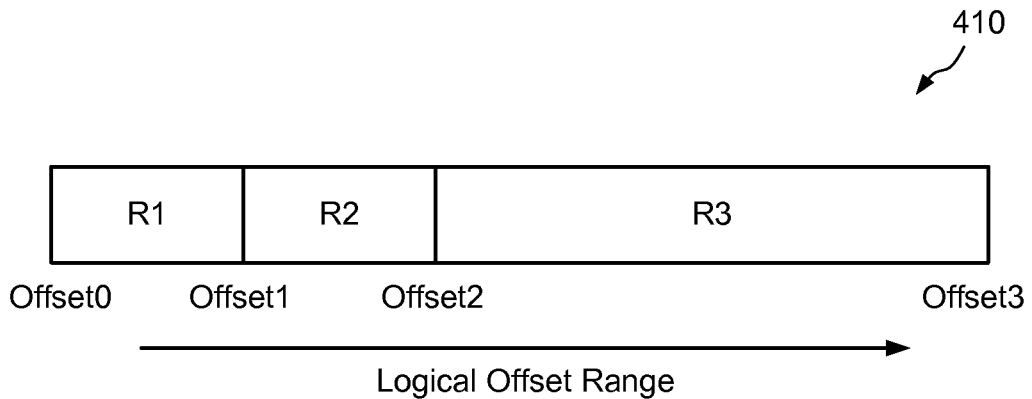
FIG. 4 is a block diagram showing an example QoS (Quality of Service) map that relates multiple ranges of a data object to respective storage tiers on which to store data in the ranges of the data object.

FIG. 4 shows an example QoS map 154a, which provides a manner of storing and conveying the QoS information 154. Here, the QoS map 154a associates different portions of an object representation 410 with respective storage tiers. The object representation 410 may represent a LUN, a host file system, a VVol, or some other data object. In an example, the object representation 410 is expressed as a sequence of block locations covering a continuous span of logical offsets. Each block location in the object representation 410 thus has a unique logical address relative to a starting offset, e.g., Offset0. For instance, a first range of contiguous block locations, R1, extends from Offset0 to Offset1-1. Likewise, a second range of contiguous block locations, R2, extends from Offset1 to Offset2-1, and a third range extends from Offset2 to Offset3. The QoS map 154a associates each of the ranges, R1, R2, and R3, with a respective storage tier.

In an example, the object representation 410 refers to a host file system, and each of the ranges R1, R2, and R3 refers to a different sub-space of the host file system, such as an inode space, an indirect block space, and a data space, for example. Any number of ranges may be provided. At the low extreme, a single range may be provided to represent the entire object. At the high extreme, a different range may be provided for each block.

In an example, the layout of ranges in the object representation 410 is predetermined and remains constant even as the data object that it represents changes. Thus, the depicted ranges may correspond to reserved logical address spaces, which may be populated or vacated over the course of the data object's lifetime. Any block written to a location within a depicted range receives the QoS that the QoS map 154a specifies for that range.

In some examples, the object representation 410 corresponds to a sequence of block locations in the internal volume that supports the data object (e.g., any of volumes 324, 326, or 328 of FIG. 3), such that different logical offsets into the internal volume correspond to different ranges. In other examples, the object representation 410 corresponds to a sequence of block locations in an internal file that supports the data object (e.g., any of files F1, F2, or F3 of FIG. 3). In still other examples, the object representation 410 corresponds to a sequence of block locations in the lower-deck file system that supports the data object (e.g., any of file systems 330, 340, or 350 of FIG. 3). Alternatively, the object representation 410 may correspond to a specially-built data structure, decoupled from any metadata already used within the IO stack 140.

The QoS map 154a provides an efficient means of storing and processing tiering information. For example, when the IO stack 140 receives an IO request 112 to write to a particular block address, the tiering manager 152 identifies the range (e.g., one of ranges R1, R2, and R3) in which the block address falls and looks up the associated storage tier for that range in the QoS map 154a. The tiering manager 152 may then apply a tag to the IO request 112 designating the indicated storage tier, which lower levels of the IO stack 140 may apply when storing data specified at the block address.

The QoS map 154a also provides an efficient way of conveying QoS information 154 from a source data storage system to a destination data storage system. For example, the data storage system 116 may convey the QoS map 154a for a data object to the destination prior to commencing replication on the data object. When replication operations begin, an IO stack 140 running on the destination receives replication instructions from the source. The replication instructions specify data writes to designated block locations. The IO stack 140 on the destination treats the replication instructions as it would any IO request 112. For example, a tiering manager 152 running in the IO stack 140 on the destination identifies block addresses specified in arriving replication instructions, accesses the QoS map 154a to identify associated ranges and storage tiers, and applies tags to the replication instructions. The tags indicate the storage tiers specified in the QoS map 154a. Lower levels of the IO stack 140 on the destination apply the tiering information from the tags when storing the arriving data. Provision of the QoS map 154a thus enables QoS information 154 specifying any number of storage tiers to be sent from source to destination all at once for an entire data object, prior to sending replication instructions. The QoS map 152 thus avoids having to send tags or other forms of QoS information 154 from source to destination for each block or for each replication instruction.

Figure 5:
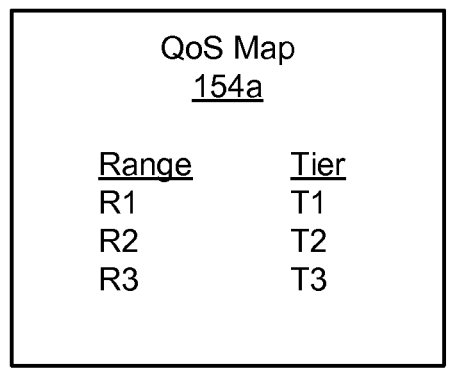
FIG. 5 is a block diagram showing an example inode of a data object, where the inode includes a field for providing QoS information of the data object.

FIG. 5 shows an alternative arrangement for storing QoS information 154. Here, a lower-deck file system (FIGS. 2 and 3) stores QoS information 154 for a particular data object in an inode 510 of a file that realizes the data object. For example, if the data object is taken to be the LUN 310 (FIG. 3), then the lower-deck file system 330 realizes the LUN 310 in the file 336 (F1) and the inode 510 corresponds to the inode 334. The inode 510 includes a field 512, which indicates a desired QoS for the entire data object. When performing writes to the data object represented by the inode 510 (e.g., the LUN 310), the IO stack 140 stores data according to the storage tier indicated within the field 512. The arrangement of FIG. 5 may be useful in circumstances in which multiple storage tiers per data object are not necessary, or in circumstances in which information upon which to base tiering decisions is not available.

When performing replication on the data object represented by the inode 510, the tiering manager 152 may read the inode 512, obtain the tiering information 154 from the field 512, and direct the data storage system 116 to send the tiering information to the destination data storage system. In an example, the data storage system 116 sends the tiering information from the field 512 via a control path established between replication managers 162 on the source and destination. The destination may apply the tiering information when storing blocks to support a replica of the data object on the destination.

According to some variants, instead of or in addition to providing a QoS field 512, the inode 510 may provide multiple QoS fields in respective block pointers (BP 1, BP 2, IB 1, and IB 2). As is known, inodes include direct block pointers and indirect block pointers, which point to blocks by designating their file system block numbers, e.g., FSBN 1 to FSBN 4. Any of these pointers may include an associated QoS field (labeled QoS 1, QoS 2, QoS 3, etc.) that designates a desired QoS for a pointed-to block. When the pointed-to block is an indirect block, as shown for QoS 3, the QoS field may provide a single QoS value for all data blocks pointed-to by the indirect block. Of course, indirect blocks may point to other indirect blocks, each of which may include their own QoS fields. The data storage system 116 may convey such QoS information in block pointers to the destination in the same manner described above for the QoS field 512.

Figure 6:
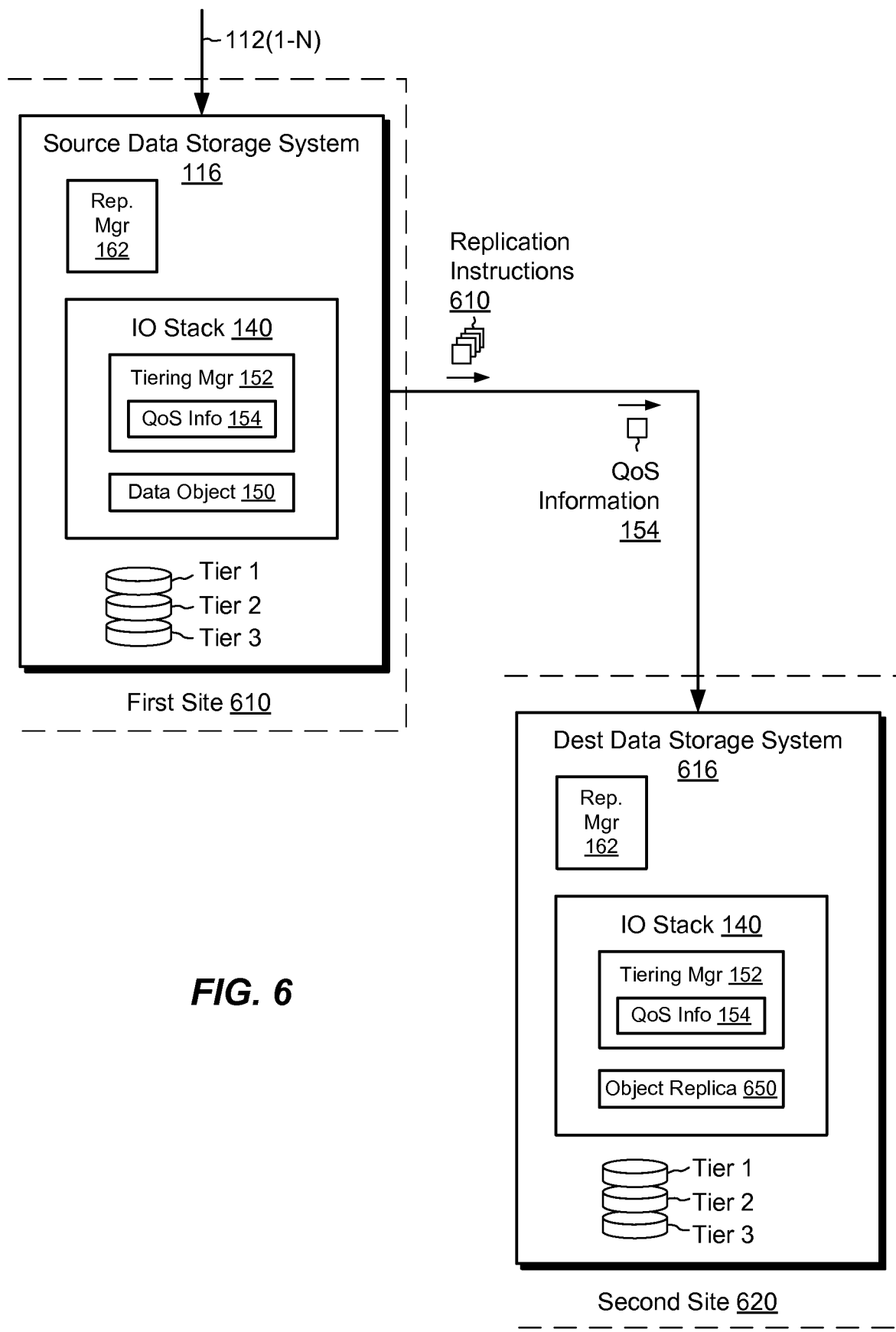
FIG. 6 is a block diagram showing an example arrangement for preserving the QoS of a data object when replicating the data object from a source data storage system to a destination data storage system.

FIG. 6 shows an example arrangement for preserving QoS information when replicating a data object 150 from a source data storage system 116 (source) at a first site 610 to a destination data storage system 616 (destination) at a second site 620. The illustrated arrangement is generic and therefore common to all replication technologies, including synchronous replication, asynchronous replication, continuous replication, and snapshot shipping replication, for example.

Here, the source 116 generates QoS information 154 for the data object 150, e.g., using any of the techniques described above. The data object may be a LUN, a host file system, a VVol, or any type of data object, for example, which is accessible to one or more of the hosts 110(1-N) from the source 116. The source 116 transmits the QoS information 154 to the destination 616, e.g., as a QoS map 154a, as a value from an inode field 512, as inode pointer fields, as a sequence of tags 210 (FIG. 2), or via any other means.

Once the replication managers 162 have established replication on the data object 150 between the source 116 and the destination 616, the source 116 sends replication instructions 610 to the destination 616. The replication instructions 610 specify data to be written to a replica 650 of the data object in the destination 616. For example, the replication instructions 610 specify one or more locations of blocks relative to the data object 150 (e.g., their respective FSBN's) and values of the respective blocks.

In some examples, the destination 616 receives the QoS information 154 from the source 116 prior to the destination receiving any replication instructions 610. For instance, the destination 616 may receive a QoS map 154a, the value of a QoS field 512 from an inode, or values of multiple QoS fields from block pointers, prior to the destination 616 receiving the replication instructions 610. In such examples, the tiering manager 152 in the destination 616 applies the QoS information 154 to arriving replication instructions 610, to store the data specified in the replication instructions 610 in the designated storage tiers.

In other examples, the destination 616 receives the QoS information 154 simultaneously with receiving the replication instructions 610. For example, the replication instructions 610 may be provided in the form of tagged IO requests 112a (FIG. 2), which include tags 210 that specify QoS information 154. When the source 116 mirrors the tagged IO requests 112a to the destination 616, the source 116 provides both the replication instructions 610 and the QoS information 154 to the destination 616. In these examples, the tiering manager 152 in the destination 616 reads the tags 210 in the tagged IO requests 112a and applies the tiering information specified in the tags 210 to store the data specified in the tagged IO requests 112a in the designated storage tiers.

Figure 7:
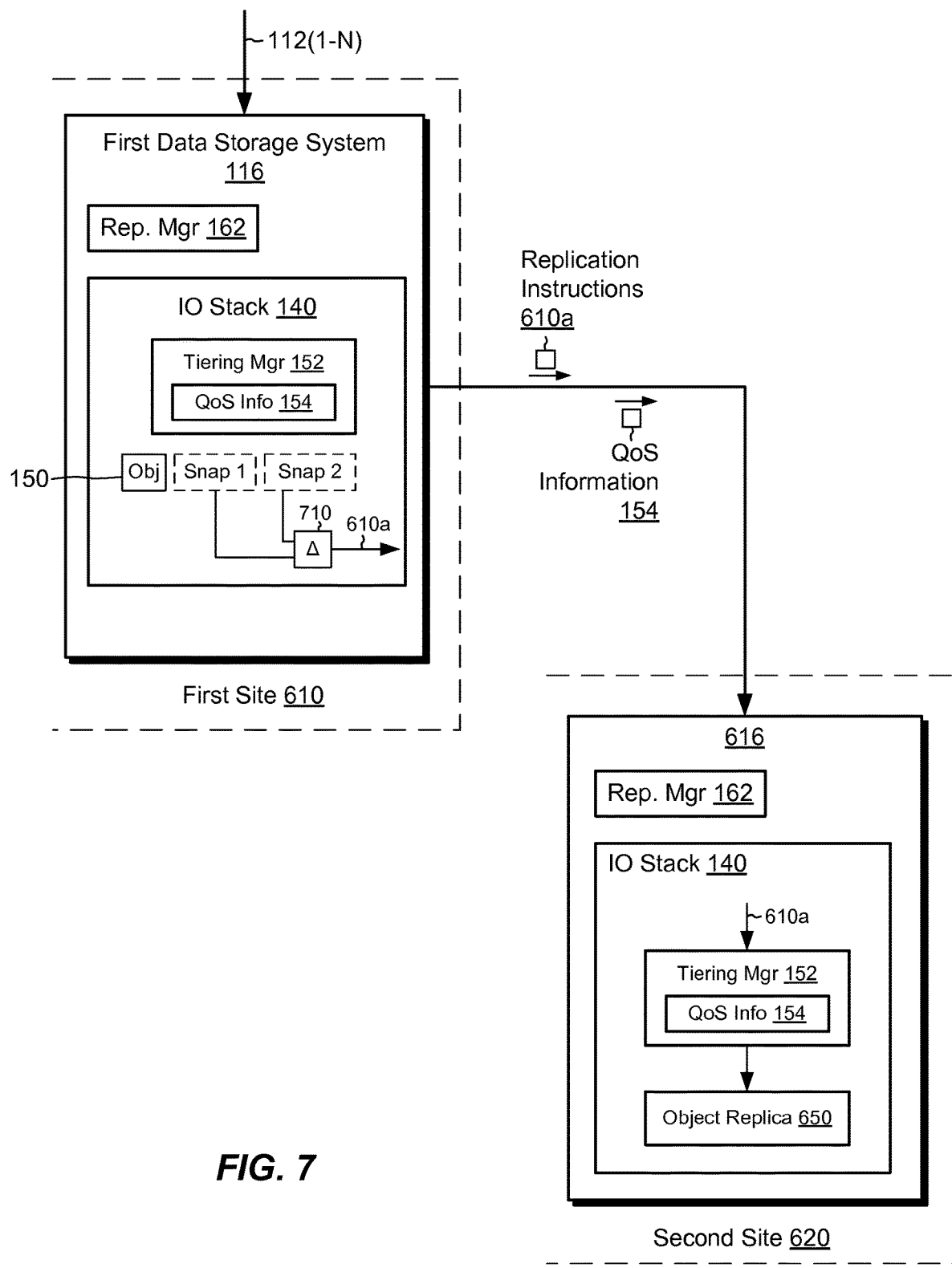
FIG. 7 is a block diagram showing an example arrangement for preserving the QoS of a data object when replicating the data object from a source data storage system to a destination data storage system using snapshot shipping.

FIG. 7 shows an example arrangement similar to the one shown in FIG. 6, except that the example here applies specifically to snapshot-shipping replication. In this arrangement, the replication managers 162 coordinate asynchronous snapshot-shipping replication between the source 116 and the destination 616 to maintain the replica 650 in the destination approximately current with the data object 150, e.g., to within limits specified in replication settings maintained by the replication managers 162. In this example, it is assumed that the source 116 sends the QoS information 154 to the destination 616 prior to replicating any data from the source 116 to the destination 616. This is not required, however, as QoS information 154 may be provided to the destination 616 in any manner and at any time.

To perform a snapshot-shipping operation, the source 116 takes a pair of snaps of the data object, computes their difference, and sends the difference to the destination 616. The destination 616 receives the difference and applies the difference to the replica 650 by storing blocks in accordance with the received QoS information 154. More specifically, the IO stack 140 in the source 116 takes a first snap (Snap 1) at a first time and takes a second snap (Snap 2) at a second time, the second time being later than the first time. The IO stack 140 then performs a difference operation 710 to generate a list 610a of changed blocks, i.e., a "block list." In an example, the block list 610a identifies the FSBN and value of each block that is different between the first snap and the second snap. The source 116 then sends the block list 610a to the destination 616 as a replication instruction. The IO stack 140 in the destination 616 receives the block list 610a and proceeds to update the replica 650 with the data specified in the block list. If the destination 616 received the QoS information 154 in the form of a QoS map 154a (FIG. 4), then the tiering manager 152 identifies a tiering level for each block in the block list 610a, e.g., by looking up a range for that block in the QoS map 154a using the block's FSBN and identifying the tiering level associated with the block's range. The tiering manager 152 then directs the IO stack 140 in the destination to store the data specified in each block of the block list 610a in the storage tier designated for that block in the QoS map 154a. If, alternatively, the destination 616 received the QoS information 154 in the form of an inode field value 512, or in pointer fields, then the tiering manager 152 directs the IO stack 140 on the destination to store the data in accordance with the received field or fields. It is understood that the above-described snapshot-shipping operation may be repeated any number of times, e.g., as additional snaps are accumulated, to keep the replica 650 approximately current with the data object 150 while preserving quality of service in the replica 650.

Figure 8:
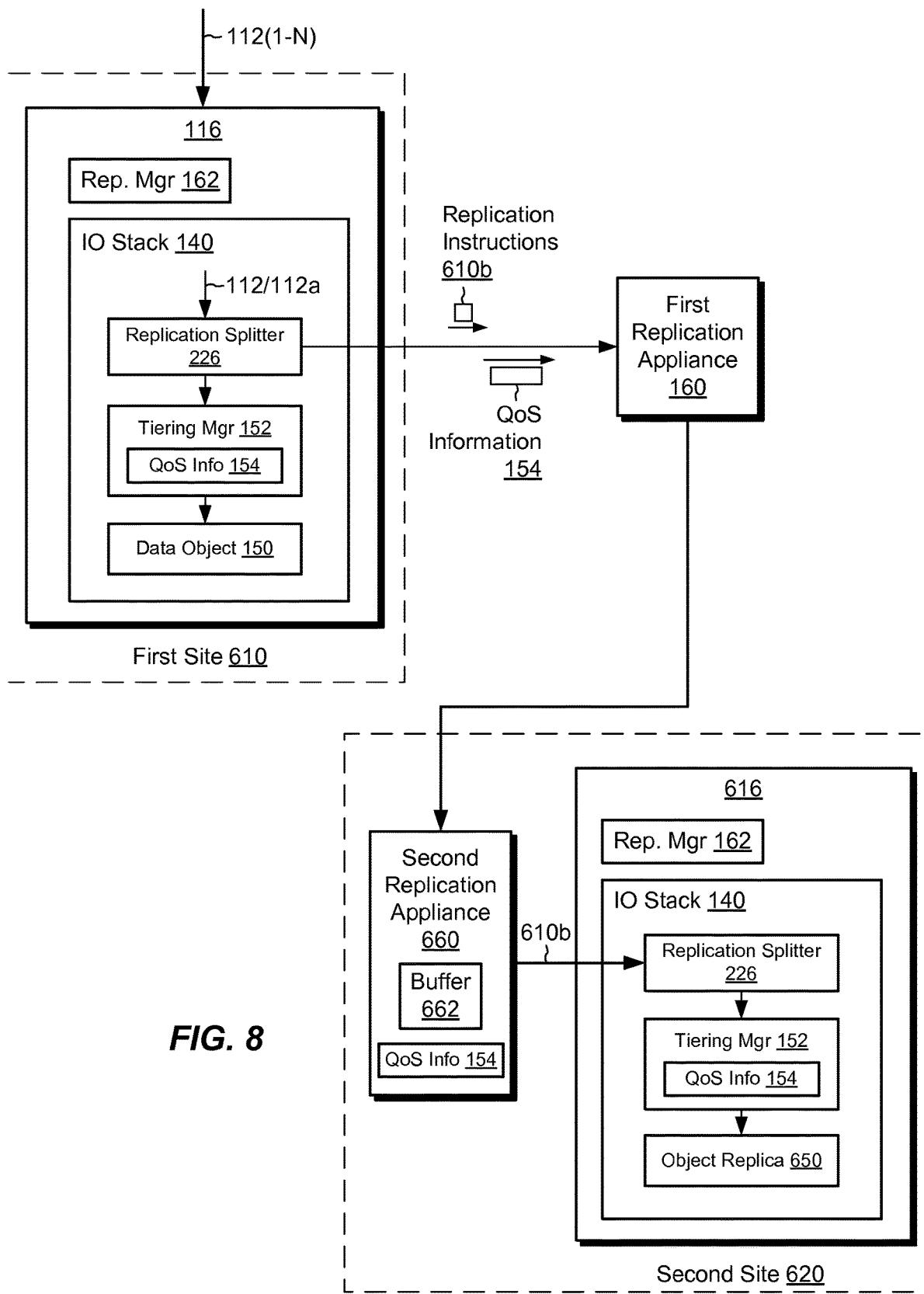
FIG. 8 is a block diagram showing an example arrangement for preserving the QoS of a data object when replicating the data object from a source data storage system to a destination data storage system using continuous replication.

FIG. 8 shows an example arrangement similar to the one shown in FIG. 6, except that the example here applies specifically to continuous replication. In this arrangement, the replication managers 162 coordinate continuous replication between the source 116 and the destination 616 to maintain the replica 650 in the destination approximately current with the data object 150. Replication in this example may be performed synchronously or asynchronously.

Preserving QoS during continuous replication may proceed in a variety of ways. In some examples, the source 116 sends the QoS information 154 to the destination 616 prior to continuously replicating any data from the source 116 to the destination 616, e.g., in the form of a QoS map 154a. In other examples, the source 116 sends the QoS information 154 to the destination incrementally, e.g., in the form of tags 210 (FIG. 2) provided in tagged IO requests 112a.

In example operation, the replication splitter 226 on the source 116 intercepts IO requests 112 or 112a (tagged or untagged) specifying data to be written to the data object 150 and mirrors the IO requests, including the data they specify, to the first replication appliance 160. The first replication appliance 160 mirrors the IO requests to a second replication appliance 660, via replication instructions 610b. The second replication appliance 660 persists the IO requests in a buffer 662 and subsequently destages the replication instructions 610b to the destination 616, where the IO stack 140 writes the data specified in the IO requests to the replica 650. If the QoS information 154 is provided in the form of tags 210 in tagged IO requests 112a, then the IO stack 140 in the destination 616 processes the IO requests 112a, with lower levels of the IO stack 140 reading the tags 210 and applying the tiering information they specify when storing the specified data. If the QoS information 154 is provided in the form of a QoS map 154a, then the IO stack 140 in the destination identifies the FSBN of any blocks associated with each IO request, looks up the associated storage tier(s) in the QoS map 154a, and proceeds to store the specified data in the storage tier(s) indicated by the QoS map 154a.

In some examples, the second replication appliance 660 assists with storage tiering by receiving the QoS information, e.g., in the form of a QoS map 154a, and applying tags (like tags 210) to IO requests received in replication instructions 610b. For example, when the second replication appliance 660 receives replication instructions 610b, the second replication appliance 660 identifies the FSBN of any blocks associated with each IO request and looks up the corresponding storage tiers in the QoS map 154a. The second replication appliance then applies a tag to each IO request. When the second replication appliance 660 then destages the IO requests to the IO stack 140 in the destination, the IO stack 140 reads the tags and assigns the storage tiering they specify when storing the specified data.

Figure 9:
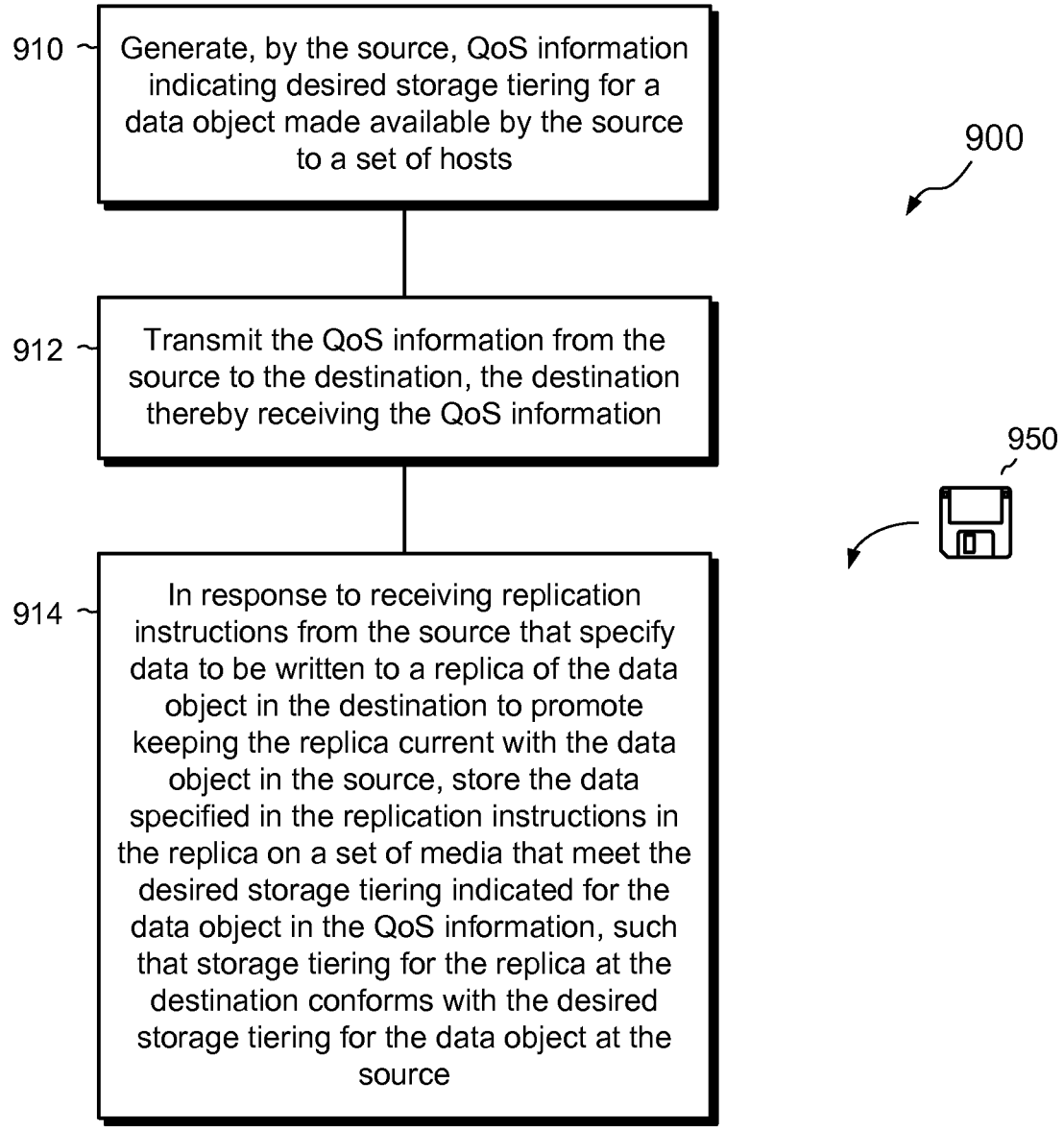
FIG. 9 is a block diagram showing an example process for preserving QoS when replicating a data object from a source data storage system to a destination data storage system.

FIG. 9 shows an example process 900 for preserving quality of service (QoS) when replicating data objects from a source data storage system (source) to a destination data storage system (destination) and provides a summary of some of the material presented above. The process 900 may be performed by the software constructs in the source and in the destination, e.g., those described in connection with FIGS. 1-3 and 5-7, which reside in the memories 130 of the storage processors 120 and are run by the sets of processing units 124. The various acts of the process 900 may be ordered in any suitable way. Accordingly, embodiments may be constructed in which acts are performed in orders different from those illustrated, which may include performing some acts simultaneously, even though the acts are shown as sequential in the illustrated embodiments.

At 910, the source generates QoS information. The QoS information indicates desired storage tiering for a data object made available by the source to a set of hosts. For example, the data storage system 116 generates QoS information 154 for the data object 150 in the form of a QoS map 154a, in the form of tags 210, in the form of an inode field 512, in the form of inode pointer fields, or in some other form. The data object 150 is accessible to hosts 110(1-N), e.g., for reading and/or writing. The data object 150 may take the form a LUN, a host file system, a VVol, or some other type of data object.

At 912, the QoS information is transmitted from the source to the destination, such that the destination receives the QoS information. For example, the source 116 may transmit the QoS information 154 to the destination 616 in any of the forms described above. The source 116 may send QoS information 154 all at once, e.g., when a QoS map 154a, an inode field 512, or inode pointer fields are used. Alternatively, the source 116 may send QoS information 154 incrementally, e.g., in the form of tags 210.

At 914, in response to receiving replication instructions from the source that specify data to be written to a replica of the data object in the destination to promote keeping the replica current with the data object in the source, the data specified in the replication instructions are stored in the replica on a set of media that meet the desired storage tiering indicated for the data object in the QoS information, such that storage tiering for the replica at the destination conforms with the desired storage tiering for the data object at the source. For example, in response to the destination 616 receiving replication instructions 210 in the form of a block lists 210 (e.g., during snapshot shipping operations), the destination 616 writes the blocks designated in the block lists 210a to the replica 650 in the storage tier or tiers designated in a QoS map 154a. As another example, in response to the destination 616 receiving replication instructions 210 in the form of mirrored TO requests 112 or 112a (e.g., during continuous replication), the destination 616 writes the blocks to designated in the TO requests 112 or 112a in the storage tier or tiers designated in tags 210 (for TO requests 112) or in the QoS map 154a (for TO requests 112a).

An improved technique has been described for replicating a data object from a source data storage system (source) to a destination data storage system (destination). The improved technique preserves QoS (Quality of Service) by transmitting QoS information from the source to the destination and applying the QoS information when storing data at the destination that arrive in replication instructions sent from the source. The QoS information indicates desired storage tiering for the data object at the source. In the event of a failure at the source, which results in failover from the source to the destination, the destination is able to provide users with the same quality of service as was desired at the source. Reductions in quality of service when failing over from source to destination are therefore avoided.

Having described certain embodiments, numerous alternative embodiments or variations can be made. For example, although QoS information 154 has been described in the form of the QoS map 154a, tags 210, inode fields 512, and pointer fields, these are merely illustrative examples, as QoS information 154 may be provided in any form.

Also, although the data objects to which replication applies have been described as LUNs, host file systems, and VVols, these also are merely examples, as the technique described herein may be applied to any type of data object. According to some variants, objects such as virtual machine files may be realized as files in upper-deck file systems (e.g., such as host file system 312 of FIG. 3). In such examples, storage tiering for the virtual machine files may be realized using the techniques disclosed above for host file systems.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 650 in FIG. 9). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of preserving quality of service (QoS) when replicating data objects from a source data storage system (source) to a destination data storage system (destination), the method comprising:
   generating, by the source, storage tiering information indicating desired storage tiering for a data object made available by the source to a set of hosts, the desired storage tiering indicating desired performance levels of storage drives on which the data object is placed;
   transmitting the storage tiering information from the source to the destination, the destination thereby receiving the storage tiering information; and
   in response to receiving replication instructions from the source that specify data to be written to a replica of the data object in the destination to promote keeping the replica current with the data object in the source, storing the data specified in the replication instructions in the replica on a set of media that meet the desired storage tiering indicated for the data object in the storage tiering information, such that storage tiering for the replica at the destination conforms with the desired storage tiering for the data object at the source,
   wherein generating the storage tiering information includes generating a QoS map that associates each of a set of ranges of the data object with a respective storage tier, and wherein transmitting the storage tiering information from the source to the destination includes sending the QoS map from the source to the destination.

2. The method of claim 1, wherein sending the QoS map from the source to the destination is performed prior to the destination receiving the replication instructions.

3. The method of claim 1, wherein each of the replication instructions is part of a respective snapshot shipping operation between the source and the destination, the snapshot shipping operation including:
   generating, by the source, a first snap of the data object at a first time and a second snap of the data object at a second time;
   identifying a set of blocks that are different between the first snap and the second snap;
   sending the set of blocks from the source to the destination, and
   applying, by the destination, the set of blocks to the replica to make the replica content-consistent with the data object as of the time that the second snap was generated,
   wherein each of the set of blocks is located within one of the set of ranges that the QoS map associates with a respective storage tier, and wherein applying the set of blocks to the replica includes (i) the destination accessing the QoS map and (ii) the destination storing each of the set of blocks on the storage tier that the QoS map associates with the range within which the respective block is located.

4. The method of claim 1,
   wherein the replication instructions include continuous replication instructions for mirroring IO requests received by the source to the destination, the IO requests specifying data to be written to the data object on the source,
   wherein storing the data specified in the replication instructions includes, for each mirrored IO request, (i) appending a tag to the mirrored IO request, the tag indicating a desired storage tiering for the data specified in the IO request as provided in the QoS map, (ii) providing the mirrored IO request, including the tag, to an IO stack on the destination, and (iii) storing, by the IO stack on the destination, the data specified by the mirrored IO request on the tier of storage indicated by the tag.

5. The method of claim 1, wherein generating the storage tiering information includes specifying a single QoS for the data object as a whole, and wherein the method further comprises, for a second data object made available by the source:
   generating, by the source, second storage tiering information indicating desired storage tiering for the second data object, the second storage tiering information specifying a single QoS for the second data object as a whole;
   transmitting the second storage tiering information from the source to the destination, the destination thereby receiving the second storage tiering information; and
   in response to receiving second replication instructions that specify data to be written to a replica of the second data object at the destination, storing the data specified in the second replication instructions in the replica on a set of media that meet the desired storage tiering indicated for the second data object in the second storage tiering information.

6. The method of claim 1,
   wherein generating the storage tiering information for the data object includes (i) specifying a first storage tier for storing a first portion of the data object and (ii) specifying a second storage tier for storing a second portion of the data object,
   wherein the data specified by the replication instructions include (i) a first set of data indicating changes in the first portion of the data object and (ii) a second set of data indicating changes in the second portion of the data object, and wherein storing the data specified by the replication instructions in the replica includes (i) accessing the received storage tiering information, (ii) storing the first set of data on a first set of storage media providing first storage tier, and (iii) storing the second set of data on a second set of storage media providing the second storage tier.

7. The method of claim 6, wherein the first set of data includes metadata of the data object and the first set of storage media include a set of flash drives, and wherein the second set of data includes non-metadata data of the data object and the second set of storage media include a set of magnetic disk drives.

8. The method of claim 1, wherein the replication instructions include instructions for performing multiple continuous replication operations, wherein receiving the storage tiering information from the source includes receiving a respective portion of the storage tiering information with each of the replication instructions, and wherein the method further comprises:

receiving, by the source, an IO request from one of the set of hosts, the IO request specifying data to be written to the data object; and appending, by the source, a tag to the IO request, the tag specifying a desired QoS for storing the data specified by the IO request, wherein transmitting the storage tiering information from the source to the destination includes the source mirroring the IO request, including the tag, to the destination, and wherein storing the data specified in the replication instructions includes reading the tag by the destination and storing, by the destination, the data specified by the IO request in a set of storage media that meet the QoS specified in the tag.

9. The method of claim 1, further comprising:

detecting, by the source, that a portion of the data object for which the storage tiering information specifies a slower tier of storage has become frequently accessed by the set of hosts;

in response to detecting the frequent access, changing the storage tiering information for the portion of the data object to specify a faster tier of storage;

transmitting the changed storage tiering information from the source to the destination; and in response to receiving subsequent replication instructions from the source that specify data from the portion of the data object to be written to the replica, storing the specified data on a set of storage media that meet the changed storage tiering information specifying the faster tier of storage.

10. The method of claim 1, wherein the source fails to provide all of the desired storage tiering for the data object specified in the storage tiering information, and wherein the destination succeeds in providing all of the desired storage tiering for the data object specified in the storage tiering information.

11. The method of claim 1, wherein the method further comprises internally realizing the data object in a form of a container file within an internal, container file system on the source, wherein the container file system on the source includes an inode for the container file that realizes the data object on the source, wherein the inode for the container file includes a field that specifies a desired QoS for the data object as a whole, and wherein transmitting the storage tiering information from the source to the destination includes the source reading the field in the inode for the container file and sending a value of the field to the destination.

12. A computerized system, comprising a source data storage system (source) coupled to a destination data storage system (destination) over a network, the source having a first set of processing circuitry and first memory, the destination having a second set of processing circuitry and second memory, the system constructed and arranged to:

generate, by the source, storage tiering information indicating desired storage tiering for a data object made available by the source to a set of hosts, the desired storage tiering indicating desired performance levels of storage drives on which the data object is placed;

transmit the storage tiering information from the source to the destination over the network, the destination thereby receiving the storage tiering information; and in response to receiving replication instructions from the source that specify data to be written to a replica of the data object in the destination to promote keeping the replica current with the data object in the source, store the data specified in the replication instructions in the replica on a set of media that meet the desired storage tiering indicated for the data object in the storage tiering information, such that storage tiering for the replica at the destination conforms with the desired storage tiering for the data object at the source, wherein the system constructed and arranged to generate the storage tiering information is further constructed and arranged to generate a QoS map that associates each of a set of ranges of the data object with a respective storage tier, and wherein the system constructed and arranged to transmit the storage tiering information from the source to the destination is further constructed and arranged to send the QoS map from the source to the destination.

13. A non-transitory, computer-readable medium including instructions which, when executed by a computerized system including a source data storage system (source) and a destination data storage system (destination), cause the computerized system to perform a method of preserving quality of service (QoS) when replicating data objects from the source to the destination, the method comprising:

generating, by the source, storage tiering information indicating desired storage tiering for a data object made available by the source to a set of hosts, the desired storage tiering indicating desired performance levels of storage drives on which the data object is placed;

transmitting the storage tiering information from the source to the destination, the destination thereby receiving the storage tiering information; and in response to receiving replication instructions from the source that specify data to be written to a replica of the data object in the destination to promote keeping the replica current with the data object in the source, storing the data specified in the replication instructions in the replica on a set of media that meet the desired storage tiering indicated for the data object in the storage tiering information, such that storage tiering for the replica at the destination conforms with the desired storage tiering for the data object at the source, wherein generating the storage tiering information includes generating a QoS map that associates each of multiple ranges of the data object with a respective storage tier, and wherein transmitting the storage tiering information from the source to the destination includes sending the QoS map from the source to the destination.

14. The non-transitory, computer-readable medium of claim 13, wherein generating the storage tiering information includes specifying a single QoS for the data object as a whole, and wherein the method further comprises, for a second data object made available by the source:

generating, by the source, second storage tiering information indicating desired storage tiering for the second data object, the second storage tiering information specifying a single QoS for the second data object as a whole;

transmitting the second storage tiering information from the source to the destination, the destination thereby receiving the second storage tiering information; and in response to receiving second replication instructions that specify data to be written to a replica of the second data object at the destination, storing the data specified in the second replication instructions in the replica on a set of media that meet the desired storage tiering indicated for the second data object in the second storage tiering information.

15. The non-transitory, computer-readable medium of claim 13, wherein generating the storage tiering information for the data object includes (i) specifying a first storage tier for storing a first portion of the data object and (ii) specifying a second storage tier for storing a second portion of the data object, wherein the data specified by the replication instructions include (i) a first set of data indicating changes in the first portion of the data object and (ii) a second set of data indicating changes in the second portion of the data object, and wherein storing the data specified by the replication instructions in the replica includes (i) accessing the received storage tiering information, (ii) storing the first set of data on a first set of storage media providing first storage tier, and (iii) storing the second set of data on a second set of storage media providing the second storage tier.

16. The non-transitory, computer-readable medium of claim 13, wherein each of the replication instructions is part of a respective snapshot shipping operation between the source and the destination, the snapshot shipping operation including:

generating, by the source, a first snap of the data object at a first time and a second snap of the data object at a second time;

identifying a set of blocks that are different between the first snap and the second snap;

sending the set of blocks from the source to the destination, and applying, by the destination, the set of blocks to the replica to make the replica content-consistent with the data object as of the time that the second snap was generated, wherein each of the set of blocks is located within one of the multiple ranges that the QoS map associates with a respective storage tier, and wherein applying the set of blocks to the replica includes (i) accessing the QoS map and (ii) storing each of the set of blocks on the storage tier that the QoS map associates with the range within which the respective block is located.

17. The non-transitory, computer-readable medium of claim 13, wherein the replication instructions include instructions for performing multiple continuous replication operations, wherein receiving the storage tiering information from the source includes receiving a respective portion of the storage tiering information with each of the replication instructions, and wherein the method further comprises:

receiving, by the source, an IO request from one of the set of hosts, the IO request specifying data to be written to the data object; and appending, by the source, a tag to the IO request, the tag specifying a desired QoS for storing the data specified by the IO request, wherein transmitting the storage tiering information from the source to the destination includes the source mirroring the IO request, including the tag, to the destination, and wherein storing the data specified in the replication instructions includes reading the tag by the destination and storing, by the destination, the data specified by the IO request in a set of storage media that meet the QoS specified in the tag.

18. The method of claim 1, wherein the source data storage system and the target data storage system each include multiple storage tiers, and wherein the method further comprises, prior to storing the data specified in the replication instructions, selecting storage media of the target data storage system on which to store the data specified in the replication instructions from a storage tier of the multiple storage tiers of the target data storage system that provides the desired storage tiering specified by the storage tiering information.

* * * * *